Figure 1:
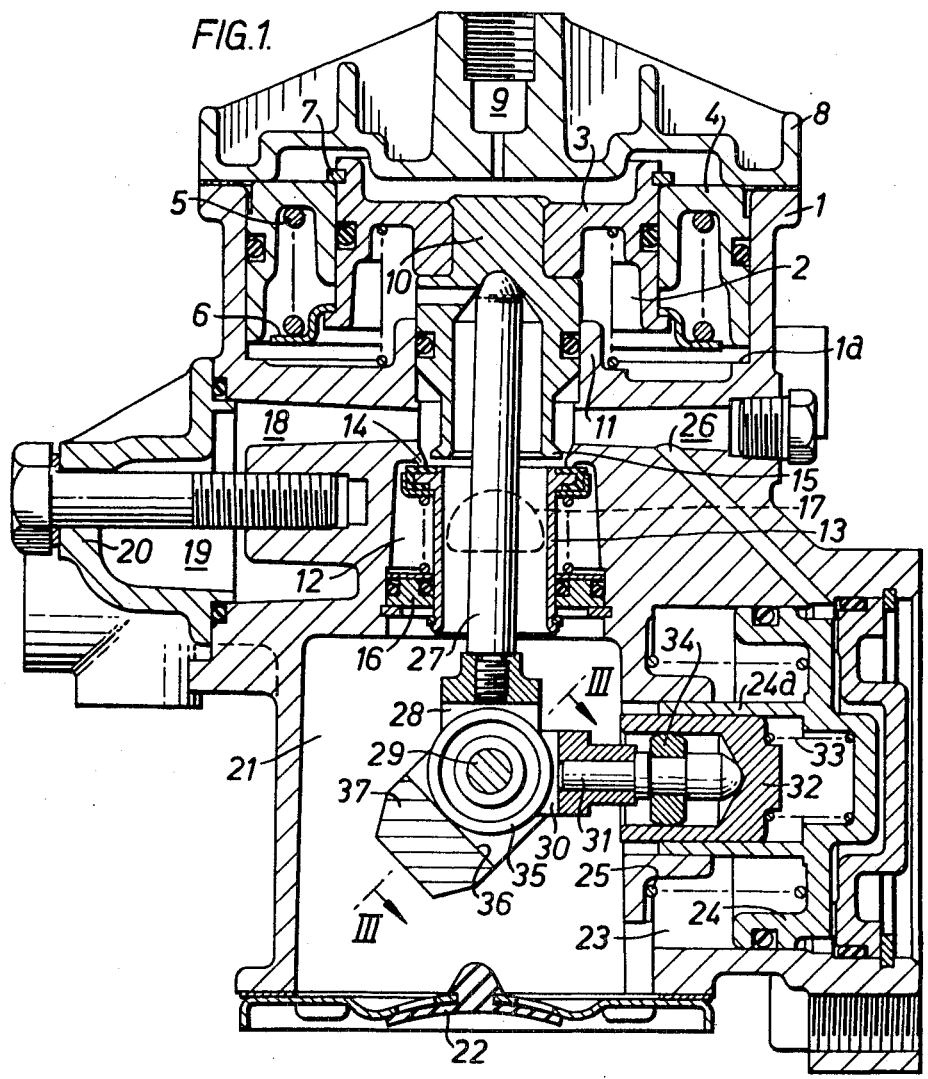

United States Patent

[11] 3,614,170

| [72] | Inventors | Wilbur Mills Page<br>London;<br>Ralph Coupland, Lincoln, both of England |
|---|---|---|
| [21] | Appl. No. | 27,703 |
| [22] | Filed | Apr. 13, 1970 |
| [23] | | Division of Ser. No. 793,763, Jan. 24, 1969 |
| [45] | Patented | Oct. 19, 1971 |
| [73] | Assignee | Clayton Dewandre Company Limited<br>Lincoln, England |
| [32] | Priority | June 29, 1968, May 16, 1968 |
| [33] | | Great Britain |
| [31] | | 4489/68 and 23374/68 |

[54] APPORTIONING VALVES FOR BRAKE SYSTEMS
5 Claims, 7 Drawing Figs.
[52] U.S. Cl. .................................................... 303/7,
188/3, 303/22 R, 303/40, 303/52
[51] Int. Cl. ........................................................ B60t 8/18,
B60t 13/26
[50] Field of Search ........................................... 303/7–8,
22, 22 A, 40, 52–54; 188/3

[56]     References Cited
UNITED STATES PATENTS

| 3,411,834 | 11/1968 | Henry-Biabaud ............ | 303/7 |
| 3,484,138 | 12/1969 | Cumming ..................... | 303/7 X |
| 3,526,438 | 9/1970 | England et al. ............... | 303/7 X |

Primary Examiner—Milton Buchler
Assistant Examiner—John J. McLaughlin
Attorney—Norris & Bateman ABSTRACT: An apportioning valve for use in an air pressure braking system comprises piston means responsive to brake line or signal pressure, valve means actuated directly by the piston means and controlling operative pressure air flow to the brake actuators, and a reaction piston responsive to the operative braking pressure and acting on the valve means in opposition to the piston means, the reaction piston acting through a member riding on an inclined plane the angle of which varies with vehicle load thereby varying the degree of reaction for a given braking effort. A relay emergency valve is mounted on or in other association with the apportioning, and it has a service port for connection to a brake control line and an emergency port for connecting to a tractor reservoir, both ports leading to the signal pressure side of the apportioning valve.

Inventors
WILBUR MILLS PAGE and
RALPH COUPLAND

Attorneys

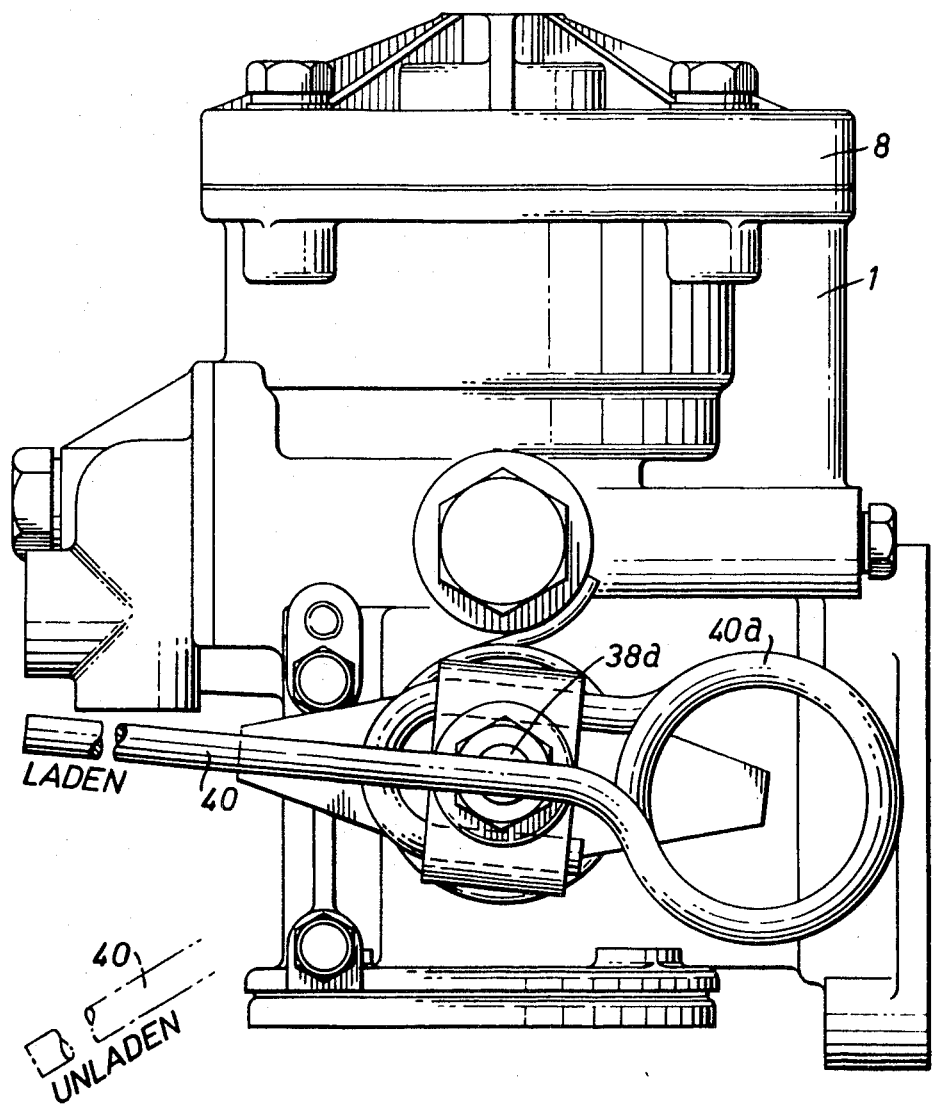

Inventors
WILBUR MILLS PAGE and
RALPH COUPLAND
Attorneys

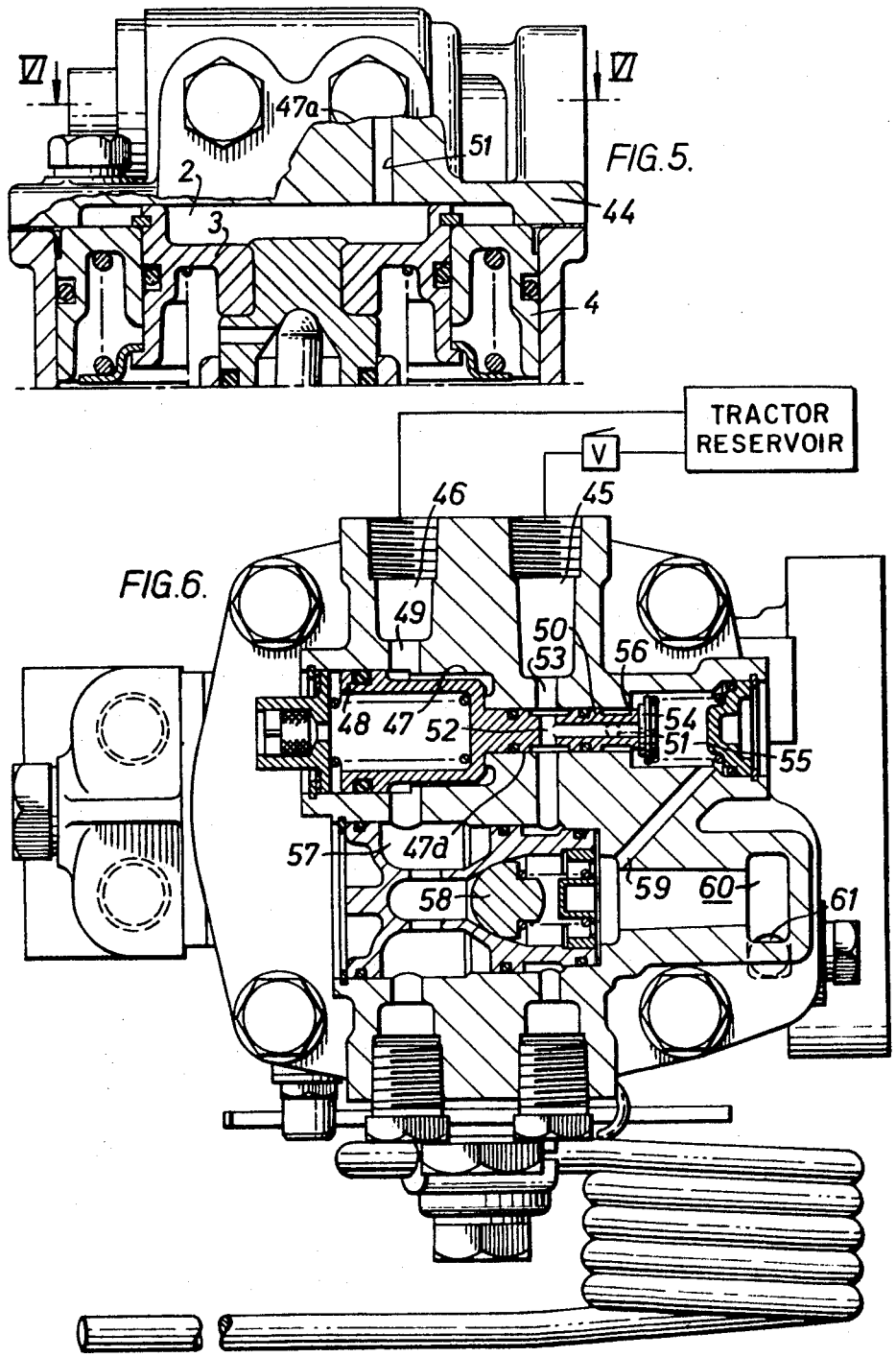

APPORTIONING VALVES FOR BRAKE SYSTEMS

This is a division of our copending application Ser. No. 793,763 filed Jan. 24, 1969 for Apportioning Valves for Brake Systems.

This invention relates to air pressure braking systems for motor vehicles and particularly to apportioning valves as used therein for regulating the braking pressure in accordance with vehicle load, the main object of the invention being the provision of an improved valve for this purpose which "cracks" at a constant effort and which is more consistent and positive in operation.

It is also an object of the invention to provide a relay emergency valve in association with the improved apportioning valve in a manner such as to simplify installation and operation of the braking system.

According to the invention there is provided an apportioning valve comprising basically means displaceable by signal pressure and arranged to actuate directly valve means controlling flow of pressure air to the brake actuators, and pressure-sensitive reaction means responsive to the active braking pressure and acting in opposition to the displacable means, said reaction means exerting its force through a member movable along an inclined plane the angle of which is variable in accordance with vehicle load.

Where the improved apportioning valve is incorporated in a dual line braking system of a tractor/trailer vehicle, the valve may be used in conjunction with a relay emergency valve either forming a unit with the apportioning valve or mounted separately upon or in association with the trailer reservoir, and these and other features of the invention will be more fully described hereafter.

Figure 3:
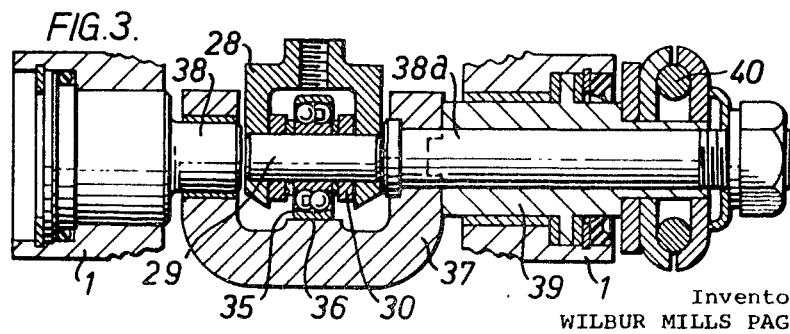
Figure 4:
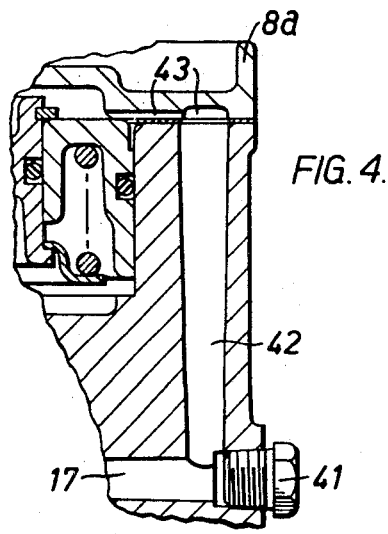
Figure 7:
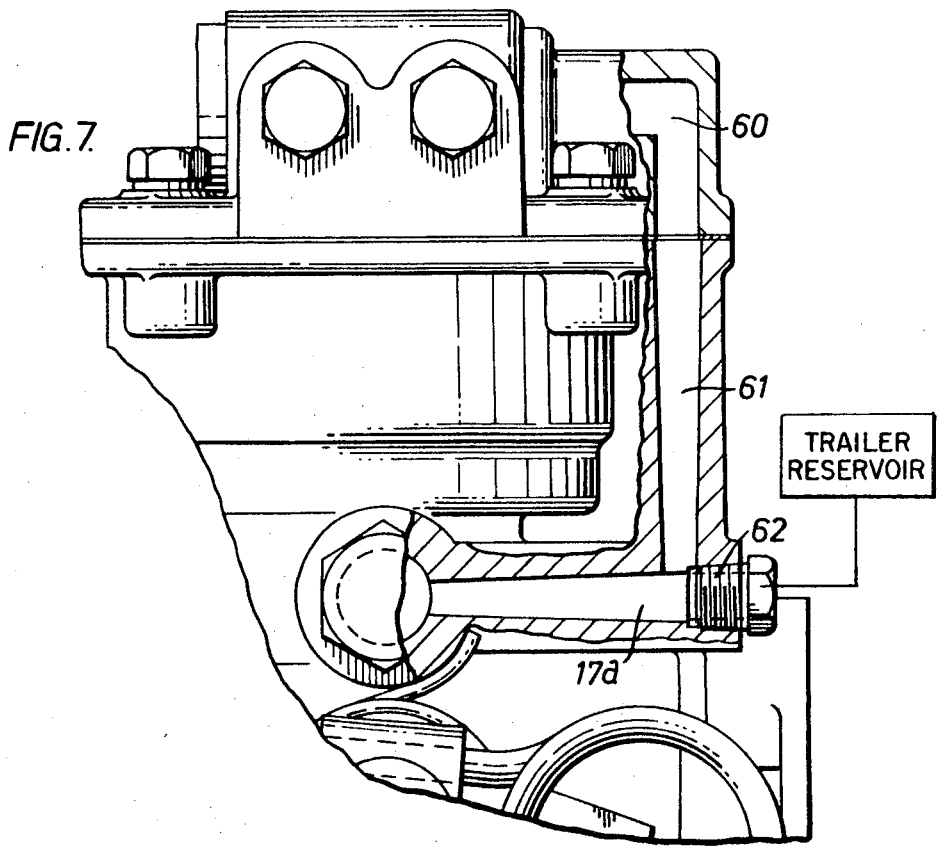

Reference will now be made to the accompanying drawings which illustrate several embodiments of the invention and wherein FIG. 1 is an axial sectional view of the improved valve in a form in which it operates as a relay valve in a single line system, FIG. 2 is a side elevation of the valve of FIG. 1, FIG. 3 is a fragmentary sectional view taken on the line III—III of FIG. 1, FIG. 4 is a fragmentary sectional view showing the manner in which the valve of FIG. 1 is modified to operate as a direct-acting or nonrelay type valve, FIG. 5 is a fragmentary sectional view corresponding to the upper part of FIG. 1 but showing the manner in which a relay emergency valve unit is substituted for the valve cover of the apportioning valve, FIG. 6 is a sectional plan view taken on the line VI—VI of FIG. 5, and FIG. 7 is a detail sectional view showing passage connections.

Referring first to FIGS. 1–3, the valve shown comprises a body or housing 1 defining in its upper part a vertical chamber 2 in which is located a displaceable input piston assembly consisting of concentric inner and outer pistons 3, 4 respectively. The outer piston is supported for limited axial movement upon the inner piston and a compression spring 5 is interposed between said outer piston and a keeper 6 on the inner piston to urge the outer piston relative to the inner piston and into abutment with a stop 7 thereon. The outer piston 4 also has sealed sliding engagement with the wall of the chamber 2 and said chamber is closed at its upper side by a valve cover 8 provided with an input port 9 adapted in use to be connected to the brake control line. The inner piston 3 is fast with a hollow stem structure 10 sliding within a tubular valve guide 11 formed integrally with the housing 1, the bore of said valve guide opening at its lower end into a valve chamber 12 within which is disposed a hollow spring-loaded poppet valve 13, the head of this valve being preferably rubber covered and cooperating with a fixed annular seating 14 at the junction of chamber 12 and the bore of valve guide 11 and with a further seating 15 formed on the lower end of stem structure 10. The chamber 12 is closed towards its lower end by a partition 16 and, above the partition is connected by a passage 17 to a port which, in use, is connected to a reservoir or like pressure air source, whilst the lower end of the bore of the valve guide is connected by a passage 18 to a port 19 which in use receives a manifold 20 embodying appropriate means establishing parallel connections to the brake actuators. The bore of the hollow poppet valve 13 opens at its lower end into an enlarged chamber 21 permanently connected to atmosphere through a check valve 22.

Formed in the lower part of the housing alongside the chamber 21 is a reaction chamber 23 within which is disposed a horizontally sliding reaction piston 24, said piston being urged outwardly by a loading spring 25 and the outer end of chamber 23 being connected by passageways 26 and the bore of the valve guide 11 to the port connections to the brake actuators. A thrust-transmitting connection is provided between the inner input piston 3 and the reaction piston 24, said connection consisting of associated piston rods pivotally interconnected at their ends remote from the pistons. More particularly and as shown, a piston rod 27 received at its upper end in an axial socket in the stem structure 10 carries on its lower end a fork 28 supporting a spindle 29 on which is mounted a roller 35 riding on an inclined surface 36, said spindle also being embraced by a second fork 30 on the inner end of a push rod 31. The outer end of the push rod 31 is received within and abuts a hollow piston guide 32 sliding in a tubular axial extension 24a of the reaction piston, a light spring 33 being interposed between the piston guide and the reaction piston and serving normally to maintain these components in spaced relation as shown. This arrangement ensures that the push rod 31 and roller 35 are kept in operative engagement at all times and also provides frictionless reaction to initial "crack-off" loads. A rubber disc 34 embracing push rod 31 has a loose fit in the piston guide 32 and serves to locate the push rod axially of the guide.

The inclined surface 36 is formed on a yoke-shaped member 37 which is oscillatably supported in the housing 1 by trunnions 38, 38a, the arrangement being such that the degree of reaction transmitted to the piston assembly 3,4 for a given movement of the reaction piston varies with the angle of inclination of the surface 36. The yoke 37 is displaced angularly in accordance with vehicle load, and in the construction illustrated the trunnion 38a extends within a sleeve 39 which is fast with the yoke 37 and which, externally of the housing, is provided with an actuating lever assembly. In use, the valve housing 1 is secured to the vehicle frame and said lever assembly is connected to a wheel axle such that the angular disposition of the yoke 37 is dependent upon the riding height of the vehicle frame. The actuating lever assembly shown consists of a torsion spring arm 40 clamped at one end to the sleeve 39 and provided with one or more coils or turns 40a intermediate its ends, while its free end is connected to the wheel axle by means not shown. In a specific embodiment with the arrangement illustrated, the lever arm 40 occupies the position shown in full lines in FIG. 2 when the vehicle is fully laden and in this condition the full available pressure is transmitted to the brake actuators. As vehicle load is reduced the lever arm moves downwards or anticlockwise relative to the housing as viewed in FIG. 2, thereby modifying the degree of reaction, and in the unladen condition, indicated in broken lines, the maximum pressure transmitted to the brake actuators may for example be 25 percent of brake line pressure. The torsion spring arm absorbs the rapid oscillations caused by road wheel travel over uneven surfaces while transmitting to the apportioning valve any relative displacement of axle and vehicle frame created by change of load and any equivalent means may be used as, for example, an articulated lever arm embodying a spring-loaded knuckle joint. Alternatively, a plain rigid operating lever arm may be used where this meets operating requirements.

The valve operates in the following manner:

Under normal running conditions, the poppet valve 13 engages the seating 14 while the seating 15 is spaced from said valve whereby the brake actuators are connected to exhaust through passage 18, the bore of the poppet valve and chamber 21. To apply the brakes, a signal input from the brake valve is introduced through the port 9 to the upper end of chamber 2, thereby displacing the piston assembly 3,4 downwards, first closing off the exhaust connection at valve seating 15 and then displacing the poppet valve from seating 14 to connect the brake actuators to the compressed air supply via passage 17. The downward movement of the input piston assembly is transmitted through the interconnected piston and push rods 27,31 to the reaction piston 24 but the pressure created in passage 18 is also transmitted through passages 26 to the outer face of the reaction piston opposing movement thereof. In practice, the reaction piston will restore the poppet valve to a lap position when a predetermined pressure has been established in the brake actuators, the degree of reaction and thereby the braking pressure created for a given braking effort being dependent upon the inclination of the yoke member and thus upon vehicle load.

Although reference is made above to initial downward movement of the input piston assembly, the two pistons do not move in unison at all times. When the dual piston assembly has moved sufficient to seat the exhaust valve and open the poppet valve and just after valve "crack-off," the downward force on the outer piston 4 due to the initial air pressure will equal the force of opposing spring 5 and move the piston downwards to a stop 1a on the housing. The provision of the additional or outer piston therefore gives an improved low valve "crack-off." However, the reaction force of the spring 5 is still applied to inner piston 3 thus opposing the initial reactive force from air pressure acting on the reaction piston. This feature will delay apportioned reaction pressure until such time as initial delivery pressure has closed the brake shoes up to the drums.

The above described valve may operate alone as a direct acting valve in a single line system and for this purpose the arrangement shown in FIG. 4 is adopted. In this instance, the passage 17 by which an air supply is connected to the valve chamber 16 is closed off at its outer end, as by a plug 41, and instead, it communicates by way of a vertical drilling 42 in the housing and peripheral and radial grooves 43 in the valve cover 8a with the interior of said cover. Thus when the input port in the valve cover is connected into the brake line and the brake valve is actuated to apply the brakes, the compressed air admitted to the valve cover will first displace the input piston assembly in the manner previously described and, when the poppet valve is moved off seating 14, then flow through passages 42, 17, 18 to the brake actuators. The operation is otherwise as described with reference to FIGS. 1-3.

Thus the invention provides an improved apportioning valve in which valve travel remains the same irrespective of the angle of the yoke member, whilst at the same time, also providing a valve construction which is economical to produce by reason of simplicity of assembly and the minimum of close tolerances.

Where the apportioning valve is used in the trailer section of a tractor-trailer air pressure braking system of the dual line type and including a relay emergency valve for effecting application of the trailer brakes in the event of a "break-away" or other conduit failure, the relay emergency valve may be superimposed directly upon the apportioning valve in place of the valve cover. As shown in FIGS. 5 and 6, the relay emergency valve in this instance comprises a housing 44 preferably having a machined lower face to seat tightly upon the upper end face of the apportioning valve housing 1, the relay emergency valve including a service port 45 for connection to the brake control line and an emergency port 46 for connection with the tractor reservoir as shown in FIG. 6. The usual operator valve V may be provided in the service line. Formed within the emergency valve housing is a stepped bore, the larger chamber 47 of which receives a spring-loaded piston 48 and, beyond the piston, is permanently connected by a passage 49 to the emergency valve port 46, the piston having a hollow stem 50 sliding in the narrower portion 47a of the bore which is connected by a further passage 51 terminating at the lower face of the housing 44 above the chamber 2 in the apportioning valve housing.

The bore in the piston stem 50 is connected by a cross passage 52 and a further passage 53 in housing 44 with the service port 45, the open end of the stem coacting with a spring-loaded disc valve 54 located in a counterbore 55. The disc valve also coacts with an annular seating 56 separating the counterbore chamber from the reduced bore portion 47a. The passage 49 is extended beyond chamber 47 to a parallel chamber 57 the outlet from which is controlled by a nonreturn valve 58. From said outlet a passage 59 leads to the counterbore 55 and further passage means 60 terminate at the lower face of the housing. At this point passage 60 communicates with a vertical passage 61 in valve housing 1 leading to a port 62 connected to the trailer reservoir as shown in FIG. 7 and by passage 17a to the chamber 12 of the apportioning valve, see FIG. 7. The valve assembly operates as follows:

When the two-line system is first established between tractor and trailer, air from the tractor reservoir will flow through the emergency line to the relay valve and past the nonreturn valve to the trailer reservoir to charge the latter. When a predetermined pressure has been established, air from the emergency line will also displace the piston 48 in the relay valve whereby the free end of the piston stem 50 is withdrawn from the disc valve 54 which remains on the annular seating 56 and connection is established through the hollow valve stem between the service port 45 and the passage 51 leading down into the apportioning valve. Thus when a braking pressure is established in the service or brake control line, it actuates the apportioning valve in the manner previously described. However, due to a break-away or pressure fall below the spring setting, or disconnection of the emergency line coupling, the holding air pressure acting on piston 48 may be destroyed. The spring behind piston 48 then moves piston 48 towards the disc valve 54, first seating the open end of stem 50 on valve 54, and then moving valve 54 away from the seating 56. The compressed air in the trailer reservoir acting through passages 61, 60 and 59 travels around the open disc valve 54, around the piston stem and down passage 51 into chamber 2. The pistons 3 and 4, operate as before to give a maximum apportioned brake application using air from the trailer reservoir to apply the trailer brakes.

An important feature of this construction is that the valve operation when going into "emergency", i.e. when the emergency line pressure falls to a predetermined value, e.g. 45/50 p.s.i. due to rupture of the pipe by any cause, is the same as normal operation when triggered by the service line during a routine braking application. In other words, the braking chambers receive a charge of air and provide a braking effort proportional to the load on the trailer.

In a modification of the above described arrangement the relay emergency valve is situated remotely from the apportioning valve e.g. upon or adjacent the trailer reservoir, and has appropriate conduit connections into the system. The relay valve is similar in construction to that above described comprising basically the stepped bore with the spring-loaded piston responsive to emergency line pressure, and the spring-loaded disc valve cooperating with the hollow stem of the piston to control flow between the service line, the trailer reservoir and the vertical chamber of the apportioning valve, additional ports being provided as required to receive the necessary conduit means by which the valve connects the service and emergency lines from the tractor to the trailer reservoir and to the apportioning valve.

We claim:

1. For use in a tractor-trailer braking system of the type wherein the tractor and trailer have separate fluid pressure reservoirs, and an apportioning valve assembly on the trailer has valve means for controlling the supply of operating fluid pressure from the tractor reservoir to brake actuator means for the trailer, pressure responsive means for actuating said valve means having an operating chamber adapted to directly receive a signal pressure and pressure-sensitive reaction means responsive to said operating fluid pressure from the tractor reservoir connected for modifying actuating of said valve means in accord with vehicle load, a relay emergency valve assembly having passage means providing fluid communication between said chamber and a port for connection to a source of said signal pressure, control valve means in said passage means and means for applying fluid pressure from said tractor reservoir to hold said control valve in position to maintain said passage means open so that said signal pressure is applied to said chamber to directly operate said valve means, and means effective when said tractor reservoir pressure falls below a predetermined value for connecting and operating said control valve means to apply fluid pressure from said trailer reservoir to said chamber for emergency operation of said trailer brakes.

2. The invention as defined in claim 1, wherein the pressure responsive means in said apportioning valve assembly comprises piston means having one side exposed to said chamber, and said relay emergency valve assembly is mounted on said apportioning valve assembly with said passage means opening into said chamber.

3. The invention defined in claim 1, wherein said apportioning valve assembly comprises a housing formed with said chamber and said pressure responsive means comprises a movable member having one side exposed to the pressure in said chamber, and said relay emergency valve unit comprises a housing fixed on said apportioning valve housing with said passage means opening directly into said chamber.

4. The invention as defined in claim 1, wherein the control valve in said relay emergency valve assembly is actuated by a control piston and means is provided for applying said tractor reservoir pressure to said control piston to hold said control valve in said passage open position.

5. The invention as defined in claim 4, wherein said relay emergency valve assembly is formed with passage means for applying said tractor reservoir pressure to said control valve piston and also through a further passage means and nonreturn valve to supply charging fluid to said trailer reservoir, said further passage means extending to provide fluid communication between the trailer reservoir and said chamber that is blocked by said control valve means while said tractor reservoir pressure remains above said predetermined value, and said control valve means being spring biased to open said further passage means to permit said trailer reservoir pressure to be applied to said chamber when the tractor reservoir pressure falls below said predetermined value, said further passage means also providing fluid communication between the trailer reservoir and said brake actuator means for the trailer.